United States Patent
Takeuchi et al.

(10) Patent No.: US 8,281,331 B2
(45) Date of Patent: Oct. 2, 2012

(54) DATA STORAGE MEDIUM SUPPORT MEMBER, CHUCKING DEVICE, BRUSHLESS MOTOR, AND DISC DRIVE APPARATUS

(75) Inventors: Hitoshi Takeuchi, Kyoto (JP); Hideya Ikemoto, Kyoto (JP); Hironori Tsukamoto, Kyoto (JP); Nobuaki Yasumoto, Kyoto (JP)

(73) Assignee: Nidec Corporation, Kyoto (JP)

( * ) Notice: Subject to any disclaimer, the term of this patent is extended or adjusted under 35 U.S.C. 154(b) by 769 days.

(21) Appl. No.: 12/398,307

(22) Filed: Mar. 5, 2009

(65) Prior Publication Data

US 2010/0192169 A1 Jul. 29, 2010

Related U.S. Application Data

(60) Provisional application No. 61/147,812, filed on Jan. 28, 2009.

(51) Int. Cl.
*G11B 17/03* (2006.01)

(52) U.S. Cl. ........ 720/707; 720/708; 720/709; 720/710; 720/711; 720/712; 720/713; 720/714; 720/715; 720/716; 720/717

(58) Field of Classification Search ........... 720/703–717
See application file for complete search history.

(56) References Cited

U.S. PATENT DOCUMENTS

| 2007/0028255 A1 | 2/2007 | Ito et al. |
| 2007/0277189 A1* | 11/2007 | Yasumoto et al. ............ 720/710 |
| 2007/0294712 A1 | 12/2007 | Ito et al. |
| 2008/0209454 A1 | 8/2008 | Ito et al. |

FOREIGN PATENT DOCUMENTS

| JP | 2003-025379 A | 1/2003 |
| JP | 2004-110919 A | 4/2004 |
| JP | 2008-135129 A | 6/2008 |

* cited by examiner

*Primary Examiner* — Jami M Valentine

(74) *Attorney, Agent, or Firm* — Keating & Bennett, LLP

(57) ABSTRACT

A data storage medium support member is produced by resin molding. The data storage medium support member includes an accommodating portion, a guide portion, and a gate cut portion. The accommodating portion accommodates a magnetic member around a central axis. The guide portion has a guide surface for guiding an inner edge of a disc, and is arranged radially outward of the accommodating portion. The gate cut portion is formed on a rear surface of the guide portion. The data storage medium support member can be produced by the resin molding while securing space for accommodating the magnetic member and preventing an increase in the axial dimension of the data storage medium support member.

14 Claims, 9 Drawing Sheets

DATA STORAGE MEDIUM SUPPORT MEMBER, CHUCKING DEVICE, BRUSHLESS MOTOR, AND DISC DRIVE APPARATUS

BACKGROUND OF THE INVENTION

1. Field of the Invention

The present invention relates to a data storage medium support member, a chucking device, a brushless motor, and a disc drive apparatus.

2. Description of the Related Art

A disc drive apparatus, such as an optical disc drive, has a brushless motor which rotates a disc. The brushless motor has a chucking device which rotates together with a rotor unit. The disc drive apparatus drives the brushless motor while holding the disc with the chucking device and a clamper provided above the chucking device, thereby rotating the disc.

The brushless motor as described above has a turntable which supports the disc while making contact with an inner edge of the disc. A brushless motor equipped with such a turntable is disclosed in JP-A 2004-110919, for example.

Some of such turntables have, within its raised guide/positioning portion for guiding the disc, a recessed accommodating portion for accommodating an attraction device, such as an annular permanent magnet. In the case where such turntables are produced by resin injection molding, a trace of a channel over which molten resin flows at the time of the injection molding and the aforementioned recessed accommodating portion must be formed in each single turntable.

Of all portions of the turntable, a portion where the trace of the molten resin channel is formed, in particular, needs to have a sufficient thickness to prevent deformation at the time of mold release. Inclusion of the trace of the molten resin channel and the recessed accommodating portion accordingly leads to an increased axial dimension of the turntable, making it difficult to reduce the thickness of the turntable.

SUMMARY OF THE INVENTION

According to a preferred embodiment of the present invention, there is provided a data storage medium support member produced by resin molding. The data storage medium support member preferably includes an accommodating portion, a guide portion, and a gate cut portion. The accommodating portion accommodates a magnetic member around a central axis. The guide portion has a guide surface for guiding an inner edge of a disc, and is arranged radially outward of the accommodating portion. The gate cut portion is formed on a rear surface of the guide portion.

According to the above preferred embodiment of the present invention, the data storage medium support member has the gate cut portion provided on the rear surface of the guide portion, which is positioned radially outward of the accommodating portion. This allows the data storage medium support member to be produced by the resin molding while securing space for accommodating the magnetic member and preventing an increase in the axial dimension of the data storage medium support member.

Note that directional terms, such as "upward", "downward", "upper", "lower", "above", "below", "left", "right", etc., used in the description of the present invention to describe the relative positions of different parts are simply used with respect to the accompanying drawings, and should not be construed to limit in any way the relative positions of those parts actually installed in a device.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Hereinafter, preferred embodiments of the present invention will be described with reference to the accompanying drawings.

Figure 1:
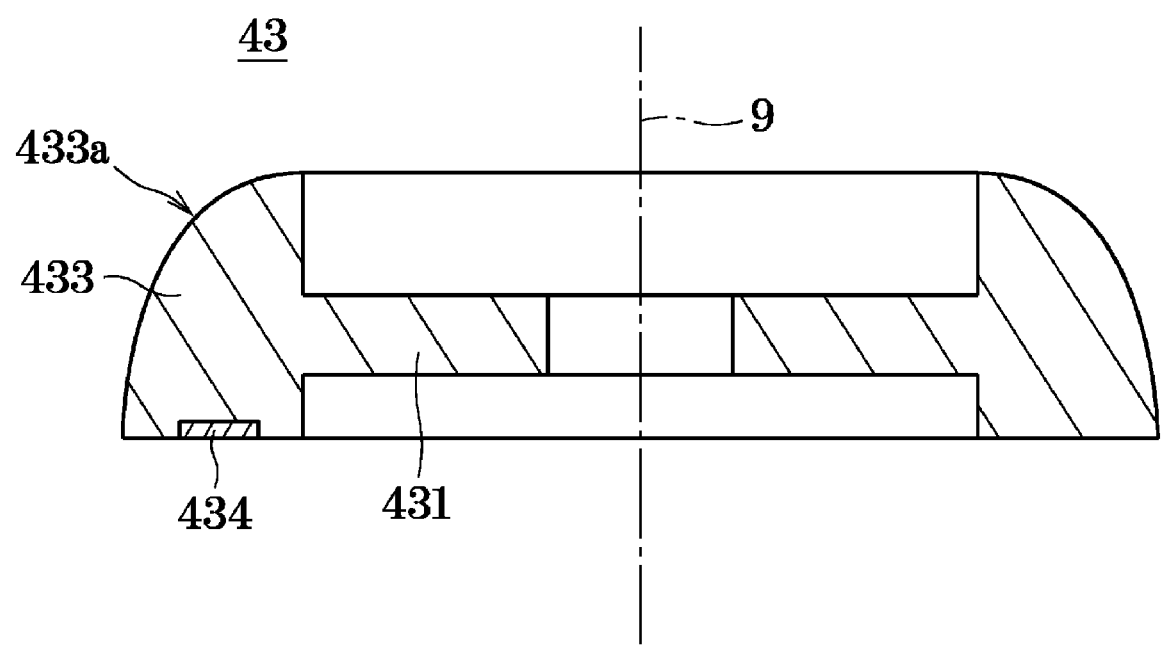
FIG. 1 is a schematic diagram illustrating a data storage medium support member.

FIG. 1 is a schematic diagram illustrating a data storage medium support member 43 according to a preferred embodiment of the present invention. The data storage medium support member 43 preferably supports a disc with a circular opening at its center by making contact with an inner edge of the disc.

Referring to FIG. 1, the data storage medium support member 43 is preferably a resin molded article. The data storage medium support member 43 preferably includes an accommodating portion 431, which is arranged around a central axis 9, and a guide portion 433, which is arranged radially outward of the accommodating portion 431 (the terms "radial", "radially", a "radial direction" as used herein refer to a direction perpendicular to the central axis 9 as appropriate). The accommodating portion 431 defines a space arranged to accommodate a magnetic member so as to retain the disc in an axial direction (the terms "axial", "axially", and an "axial direction" as used herein refer to a direction parallel to the central axis 9 as appropriate). The guide portion 433 preferably includes a guide surface 433a for guiding the inner edge of the disc.

The data storage medium support member 43 preferably includes a gate cut portion 434 provided on a rear surface of the guide portion 433. The gate cut portion 434 is formed in resin molding or the like. The provision of the gate cut portion 434 on the rear surface of the guide portion 433 allows the data storage medium support member 43 to be produced by the resin molding while securing the space for accommodating the magnetic member and reducing an axial dimension of the data storage medium support member 43. The term "rear surface" of the guide portion 433 as used herein refers to an entire lower surface of the guide portion 433, which is positioned radially outward of the space for accommodating the magnetic member and radially inward of an outermost circumference of the guide portion 433.

Next, preferred embodiments of the present invention will be described in detail.

Hereinafter, directions parallel to the central axis 9 will be referred to as upper/lower or upward/downward directions. In other words, the shape of each part and relative positions of different parts will be described on the assumption that a clamper 13 and a rotor holder 42 are positioned on the upper and lower sides, respectively, of a disc 90 when the disc 90 is retained by a chucking device 4. It should be noted, however, that this definition of the upper/lower or upward/downward directions is simply applied to facilitate the description provided herein, and should not be construed to restrict in any way the orientation of a data storage medium support member, a chucking device, a brushless motor, or a disc drive apparatus according to any embodiment of the present invention when they are actually installed in a device.

Figure 2:
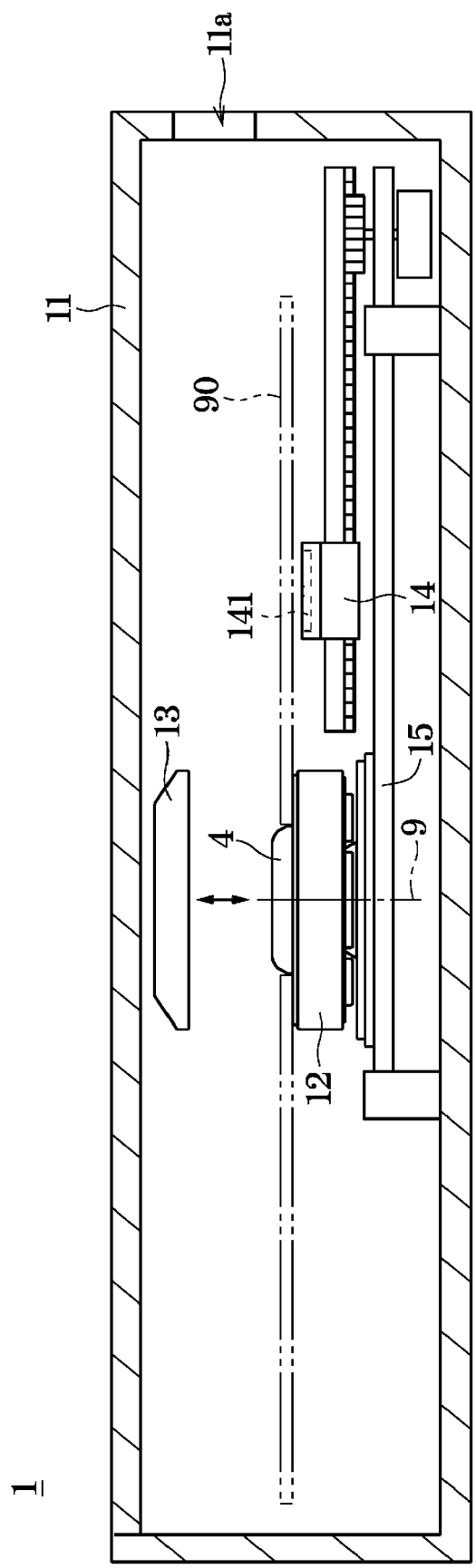
FIG. 2 is a cross-sectional view of a disc drive apparatus taken along a plane including a central axis.

FIG. 2 is a cross-sectional view of a disc drive apparatus 1 taken along a plane including the central axis. The disc drive apparatus 1 reads information from an optical disc 90 (hereinafter referred to simply as the "disc 90") or writes information to the disc 90 while rotating the disc 90 about the central axis 9. As illustrated in FIG. 2, the disc drive apparatus 1 preferably includes a device housing 11, a brushless motor 12, the clamper 13, and a recording/reproducing unit 14.

The device housing 11 preferably includes the brushless motor 12, the clamper 13, and the recording/reproducing unit 14. The device housing 11 preferably includes an opening 11a through which the disc 90 is loaded and removed. The brushless motor 12 is preferably secured to a chassis 15 contained in the device housing 11. In addition, the brushless motor 12 preferably includes thereabove the chucking device 4 arranged to retain the disc 90. The disc 90 loaded into the device housing 11 is retained by the chucking device 4 and the clamper 13, and caused by the brushless motor 12 to rotate on the central axis 9.

The recording/reproducing unit 14 causes an optical pickup portion 141 to move along a recording surface of the disc 90 rotating due to the brushless motor 12, to read the information from the disc 90 or write the information to the disc 90. Note that the optical pickup portion 141 of the recording/reproducing unit 14 may be configured to both read the information from the disc 90 and write the information to the disc 90.

Figure 3:
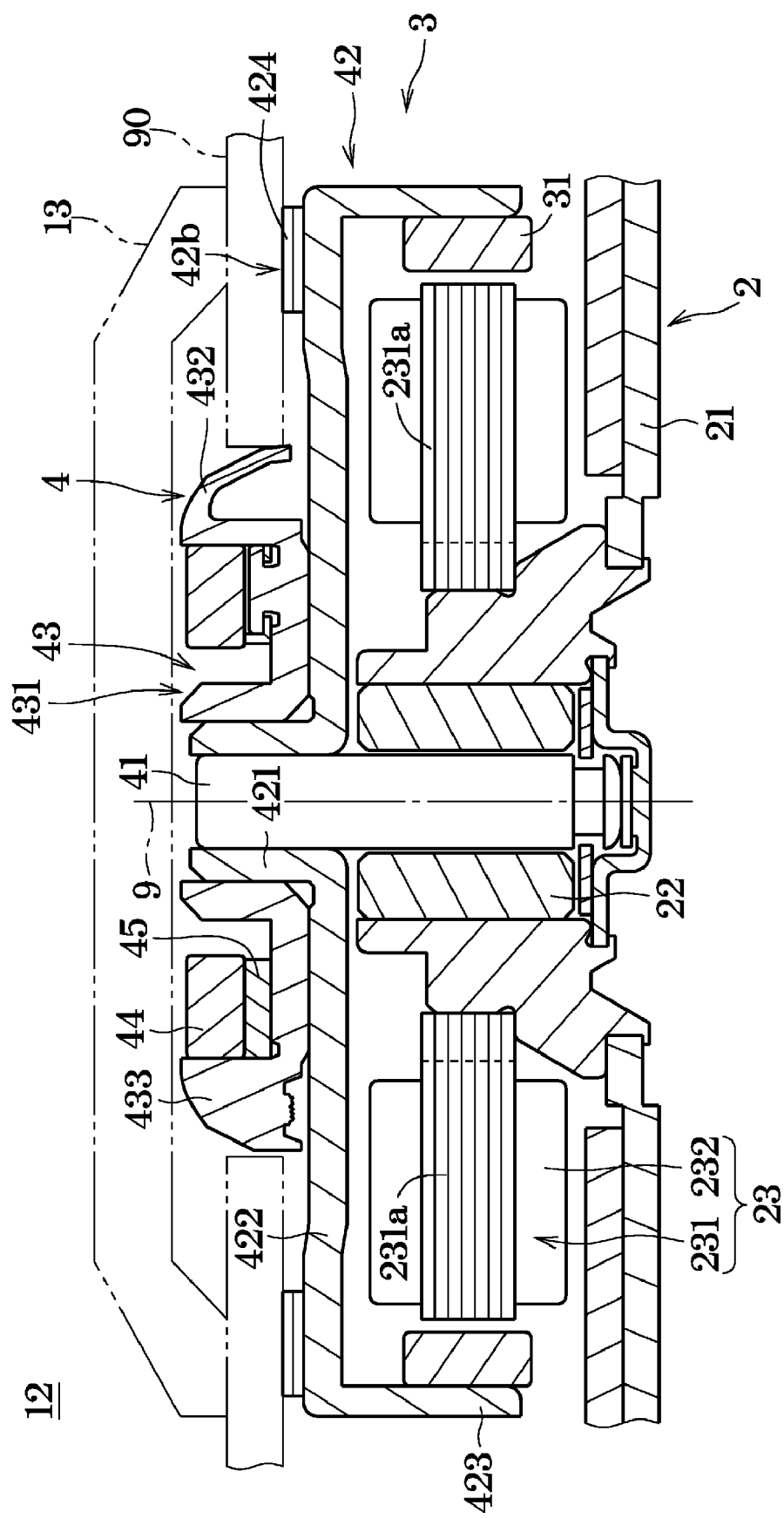
FIG. 3 is a cross-sectional view of a brushless motor taken along a plane including the central axis.

Next, the structure of the brushless motor 12 will now be described below. FIG. 3 is a cross-sectional view of the brushless motor 12 taken along a plane including the central axis. As illustrated in FIG. 3, the brushless motor 12 preferably includes a stationary unit 2, a rotor unit 3, which is supported rotatably with respect to the stationary unit 2, and the chucking device 4. The stationary unit 2 is secured to the chassis 15 of the disc drive apparatus 1. The chucking device 4, provided above the rotor unit 3, rotates together with the rotor unit 3 while retaining the disc 90.

The stationary unit 2 preferably includes a base member 21, a bearing unit 22 secured to the base member 21, and a magnetic flux generation portion 23. The bearing unit 22 is a mechanism arranged to support a shaft 41 in a rotatable condition. The magnetic flux generation portion 23 preferably includes a stator core 231 with a plurality of tooth portions 231a, and a coil 232 wound on each of the tooth portions 231a.

The rotor unit 3 preferably includes the shaft 41, the rotor holder 42, and a rotor magnet 31. The shaft 41 preferably includes a substantially cylindrical shape, and extends along the central axis 9, i.e., in the upper/lower or upward/downward directions. The rotor holder 42 is secured to the shaft 41, and thus rotates together with the shaft 41. The rotor magnet 31 is secured to the rotor holder 42. The rotor magnet 31 preferably includes a substantially annular shape. An inner circumferential surface of the rotor magnet 31 preferably defines a pole face opposed to an end face of each tooth portion 231a of the stator core 231.

Once drive current is applied to the coils 232 of the stationary unit 2, radial magnetic flux is generated at the plurality of tooth portions 231a of the stator core 231. Then, the action of the magnetic flux between the tooth portions 231a and the rotor magnet 31 produces a circumferential torque, causing the rotor unit 3 to rotate on the central axis 9 with respect to the stationary unit 2.

The chucking device 4 preferably shares the shaft 41 and the rotor holder 42 with the rotor unit 3. The chucking device 4 further includes a cone 43, a clamp magnet 44, and a back yoke 45.

The rotor holder 42 preferably includes a first cylindrical portion 421 secured to the shaft 41, a flange portion 422, and a second cylindrical portion 423. The flange portion 422 preferably extends radially outward from a lower end portion of the first cylindrical portion 421. The second cylindrical portion 423 preferably extends downward from an outer edge portion of the flange portion 422. A ring-shaped member 424, which includes a substantially annular shape, is preferably secured to an upper surface 42a of the flange portion 422. The disc 90 is arranged over the flange portion 422 with a lower surface thereof in contact with an upper surface 42b of the ring-shaped member 424. In other words, according to the present preferred embodiment, the disc mount portion preferably includes the rotor holder 42 and the ring-shaped member 424, while the upper surface 42b of the ring-shaped member 424 defines a disc mount surface.

The cone 43 preferably supports an edge of the circular central opening of the disc 90, i.e., the inner edge of the disc 90. In the present preferred embodiment, the cone 43 defines the data storage medium support member. The cone 43 is secured to the rotor holder 42. More specifically, the cone 43 is preferably in contact with an outer circumferential surface of the first cylindrical portion 421 of the rotor holder 42, and at the same time opposed to the upper surface of the flange portion 422 of the rotor holder 42 with a minimal axial gap therebetween. The cone 43 preferably includes the accommodating portion 431, a first guide portion 432, and a second guide portion 433. The accommodating portion 431 accommodates the clamp magnet 44 and the back yoke 45. The first guide portion 432 and the second guide portion 433 are positioned radially outward of the accommodating portion 431. Note that the cone 43 may be in contact with the upper surface of the flange portion 422 of the rotor holder 42.

A detailed configuration of the cone 43 will be described later.

The clamp magnet 44 and the back yoke 45 which are magnetic members are preferably accommodated inside the accommodating portion 431 of the cone 43. The clamp magnet 44 generates axial magnetic flux. The back yoke 45 which is made of a magnetic substance is provided to improve the directivity of a magnetic field produced by the clamp magnet 44. The clamp magnet 44 and the back yoke 45 generate magnetic attraction in relation to the clamper 13, thereby magnetically attracting the clamper 13 toward the rotor holder 42.

When the disc 90 is retained, the clamper 13 is attracted toward the rotor holder 42 due to the magnetic attraction between the clamp magnet 44 and the clamper 13. As a result, the disc 90 is held between the upper surface 42b of the ring-shaped member 424 and a lower surface of the clamper 13. The first guide portion 432 of the cone 43 makes contact with the inner edge of the disc 90 to adjust a radial position of the disc 90 so that a center of the disc 90 may coincide with the central axis 9. In addition, the upper surface 42b of the ring-shaped member 424 and the lower surface of the clamper 13 make contact with the lower and upper surfaces, respectively, of the disc 90 so as to adjust an axial position and orientation of the disc 90.

Figure 4:
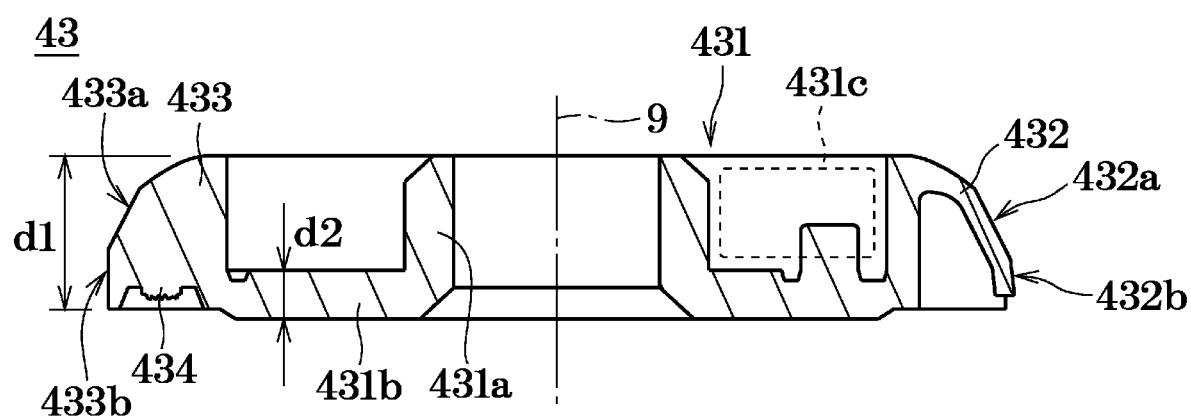
FIG. 4 is a cross-sectional view of a cone taken along a plane including the central axis.
Figure 5:
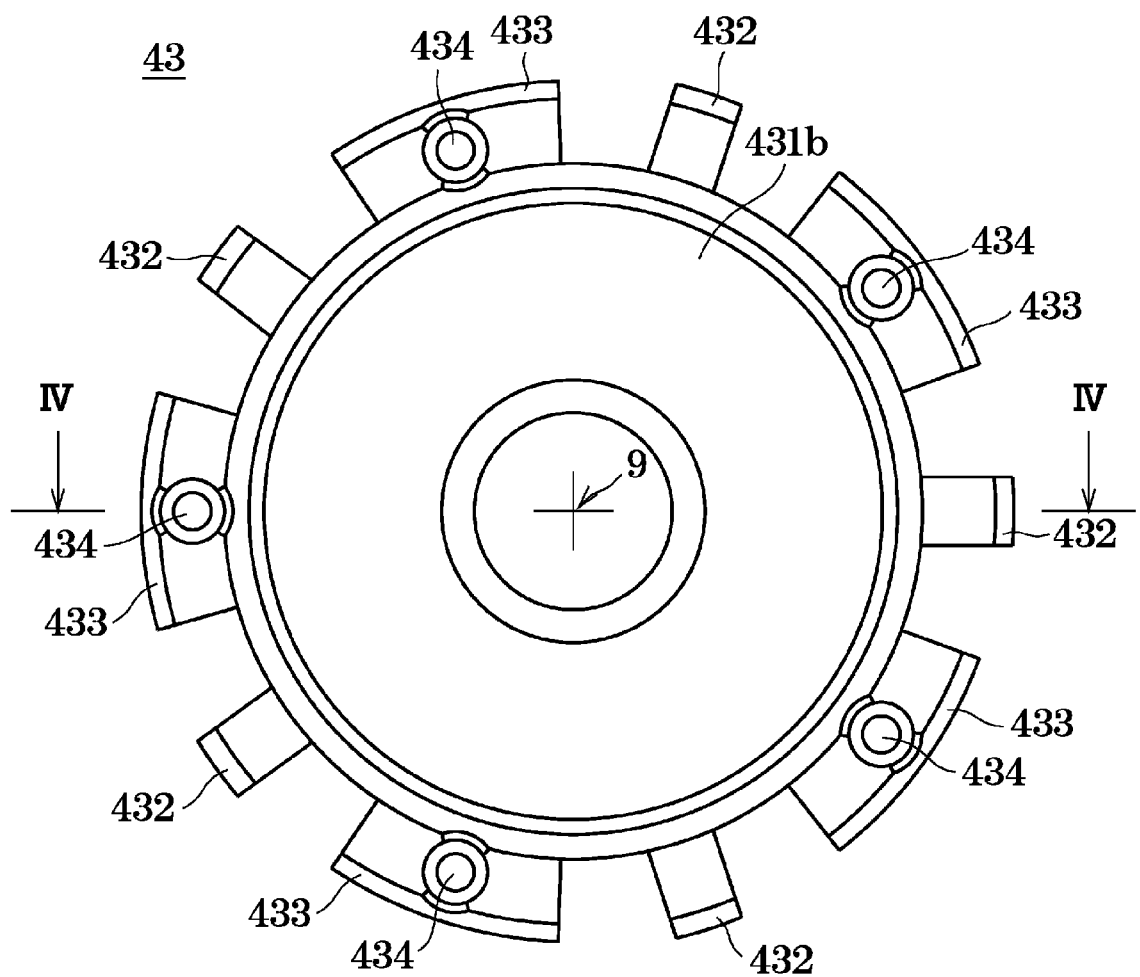
FIG. 5 is a bottom view of the cone.

Next, a more detailed configuration of the cone 43 will now be described below. FIG. 4 is a cross-sectional view of the cone 43 taken along a plane including the central axis, and FIG. 5 is a bottom view of the cone 43. FIG. 4 corresponds to a cross-sectional view of the cone 43 taken along line IV-IV in FIG. 5.

As described above, the cone 43 preferably includes the accommodating portion 431, the first guide portion 432, and the second guide portion 433. The cone 43 is a resin molded article constructed by the resin injection molding. Accordingly, it is possible to manufacture a great number of such cones 43 in a short time and at a low cost.

As illustrated in FIG. 4, the accommodating portion 431 of the cone 43 preferably includes a cylindrical portion 431a, which preferably includes a substantially cylindrical shape, and a plate portion 431b, which extends radially outward from a lower end portion of the cylindrical portion 431a. As described above, the inner circumferential surface of the cylindrical portion 431a makes contact with the outer circumferential surface of the first cylindrical portion 421 of the rotor holder 42. A lower surface of the plate portion 431b is opposed to the upper surface of the flange portion 422 of the rotor holder 42 with the minimal axial gap therebetween. A space 431c arranged to accommodate the clamp magnet 44 and the back yoke 45 is provided radially outward of the cylindrical portion 431a and above an upper surface of the plate portion 431b.

The first guide portion 432 and the second guide portion 433 are preferably arranged radially outward of the accommodating portion 431 of the cone 43. As illustrated in FIG. 5, in the present embodiment, five first guide portions 432 and five second guide portions 433 are preferably arranged alternately in a circumferential direction and at substantially regular intervals.

Each first guide portion 432 having a claw shape preferably includes a first guide surface 432a and a support surface 432b. When the disc 90 is loaded, the first guide surface 432a guides the inner edge of the disc 90 to determine the radial position of the disc 90. After loading of the disc 90, the support surface 432b preferably supports the disc 90 while making contact with the inner edge of the disc 90. When the disc 90 is fit on the cone 43, a tip portion of each first guide portion 432 slightly bends inward radially. This allows the support surface 432b to be brought into satisfactory contact with the inner edge of the disc 90 regardless of a possible slight error in size of the disc 90.

The second guide portion 433 preferably includes a second guide surface 433a and an outer circumferential surface 433b. When the disc 90 is loaded, the second guide surface 433a guides the inner edge of the disc 90 to determine the radial position of the disc 90. The outer circumferential surface 433b is formed below the second guide surface 433a. The outer circumferential surface 433b is preferably arranged slightly radially inwardly, relative to the support surface 432b of the first guide portion 432.

Figure 6:
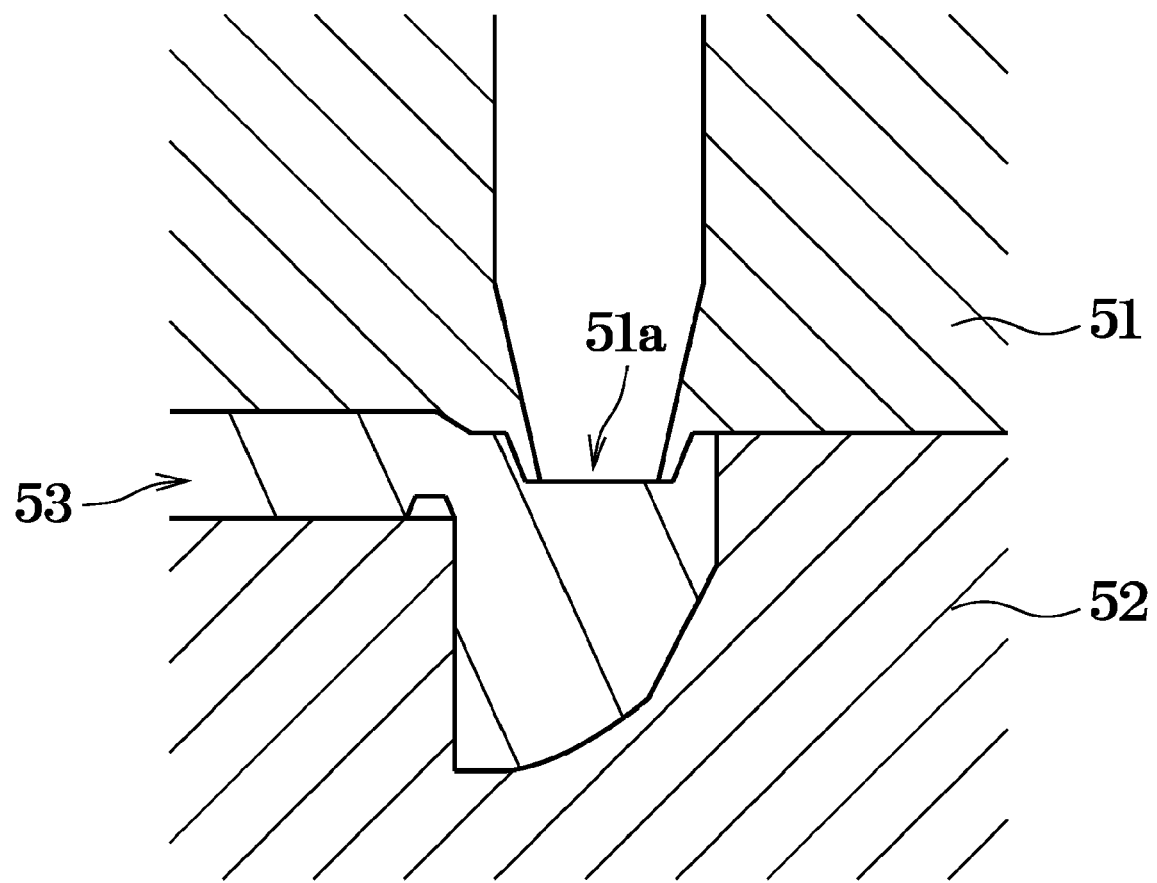
FIGS. 6 and 7 are cross-sectional views of a portion of the cone taken along a plane including the central axis, when the cone is produced by injection molding.
Figure 7:
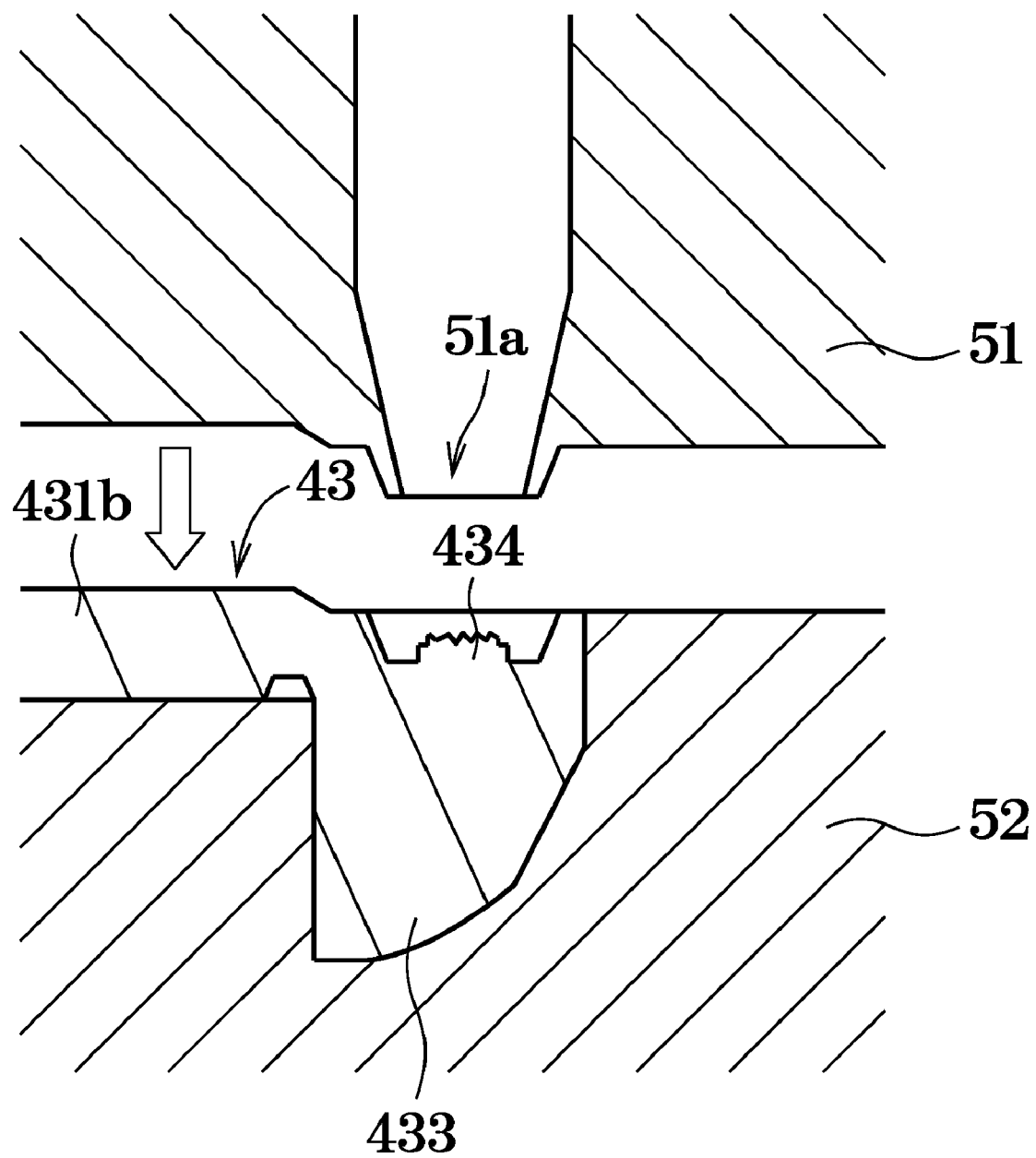

As described above, the cone 43 is made by the resin injection molding. FIGS. 6 and 7 are cross-sectional views of a part of the cone 43 taken along a plane including the central axis, when the cone 43 is produced by the injection molding.

At the time of the injection molding, molten resin is first injected into a cavity 53 arranged between a fixed mold 51 and a movable mold 52. The molten resin is injected into the cavity 53 through a gate 51a (see FIG. 6). The gate 51a is formed at a portion of the fixed mold 51 corresponding to the rear surface of the second guide portion 433. After the molten resin is hardened within the cavity 53, the movable mold 52 is moved relative to the fixed mold 51, so that the resin inside the gate 51a undergoes a rupture, resulting in separation of the fixed mold 51 and the cone 43 (see FIG. 7). Although FIG. 7 depicts the downward movement of the movable mold 52 relative to the fixed mold 51, the present invention is not limited thereto. The movable mold 52 may be moved in a variety of directions relative to the fixed mold 51 in other preferred embodiments of the present invention, insofar as they are within the spirit and scope of the present invention.

When the cone 43 is separated from the fixed mold 51, the raised gate cut portion 434 is provided on the rear surface (i.e., the lower surface) of the second guide portion 433 of the cone 43. In the present preferred embodiment, the gate cut portion 434 is preferably provided on the rear surface of the second guide portion 433, which is positioned radially outward of the accommodating portion 431. This contributes to avoiding an increase in the axial dimension of the plate portion 431b, while securing the space in which the clamp magnet 44 and the back yoke 45 are preferably accommodated, and also contributes to avoiding an increase in the axial dimension of the cone 43 as a whole. Note that, in the present preferred embodiment, the "rear surface" of the second guide portion 433 refers to the entire lower surface of the second guide portion 433, which is arranged radially outward of the space 431a in which the clamp magnet 44 and the back yoke 45 are accommodated and radially inward of the outermost circumference of the second guide portion 433.

As indicated in FIG. 4, an axial dimension d1 of the second guide portion 433 is greater than the axial dimension d2 of the plate portion 431b. That is, of the second guide portion 433 and the plate portion 431b, the gate cut portion 434 is arranged on the portion that has the greater axial dimension. This contributes to preventing deformation of a portion including the gate cut portion 434 from occurring when the gate cut portion 434 undergoes a rupture during the injection molding, and also contributes to forming a recessed portion 435 as described below around the gate cut portion 434 without leading to an extra increase in the axial dimension of the cone 43.

Referring to FIG. 5, of the first guide portions 432 and the second guide portions 433, the gate cut portion 434 is preferably arranged on the rear surface of each of the second guide portions 433, which have a greater circumferential dimension than the first guide portions 432. By virtue of such configuration, the gate cut portions 434 is arranged easily. Further, the gate 51a of the fixed mold 51 can have a sufficient size.

In the present preferred embodiment, the gate cut portion 434 is preferably arranged on each of the second guide portions 433. To be more specific, in the present preferred embodiment, five gate cut portions 434 are arranged around the central axis 9 at substantially regular intervals. Accordingly, at the time of the resin molding, it is possible to inject the molten resin into the cavity 53 through gates 51a that are arranged at substantially regular intervals around the central axis 9, with substantial uniformity. Moreover, since the plurality of gate cut portions 434 are arranged at substantially regular intervals around the central axis 9, the center of gravity of the cone 43 is not displaced.

Figure 8:
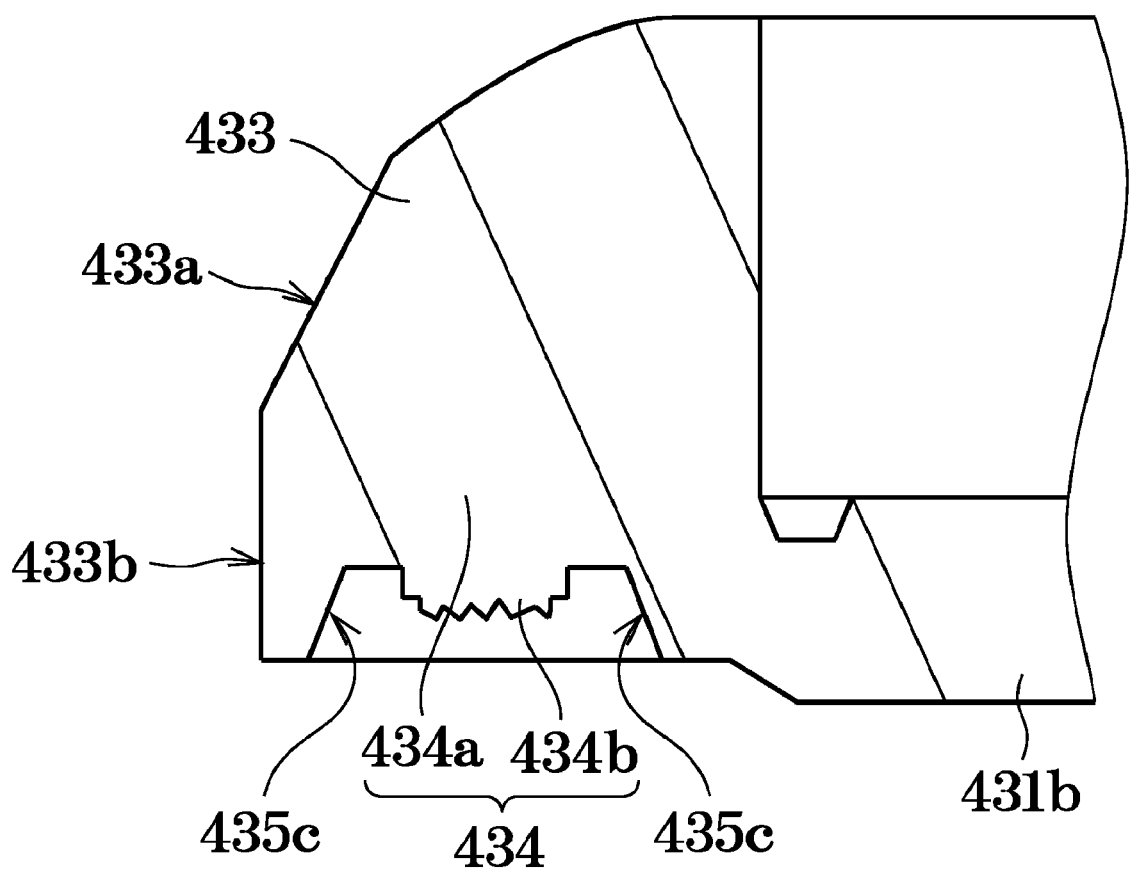
FIG. 8 is an enlarged cross-sectional view of a gate cut portion and its vicinity taken along a plane including the central axis.
Figure 9:
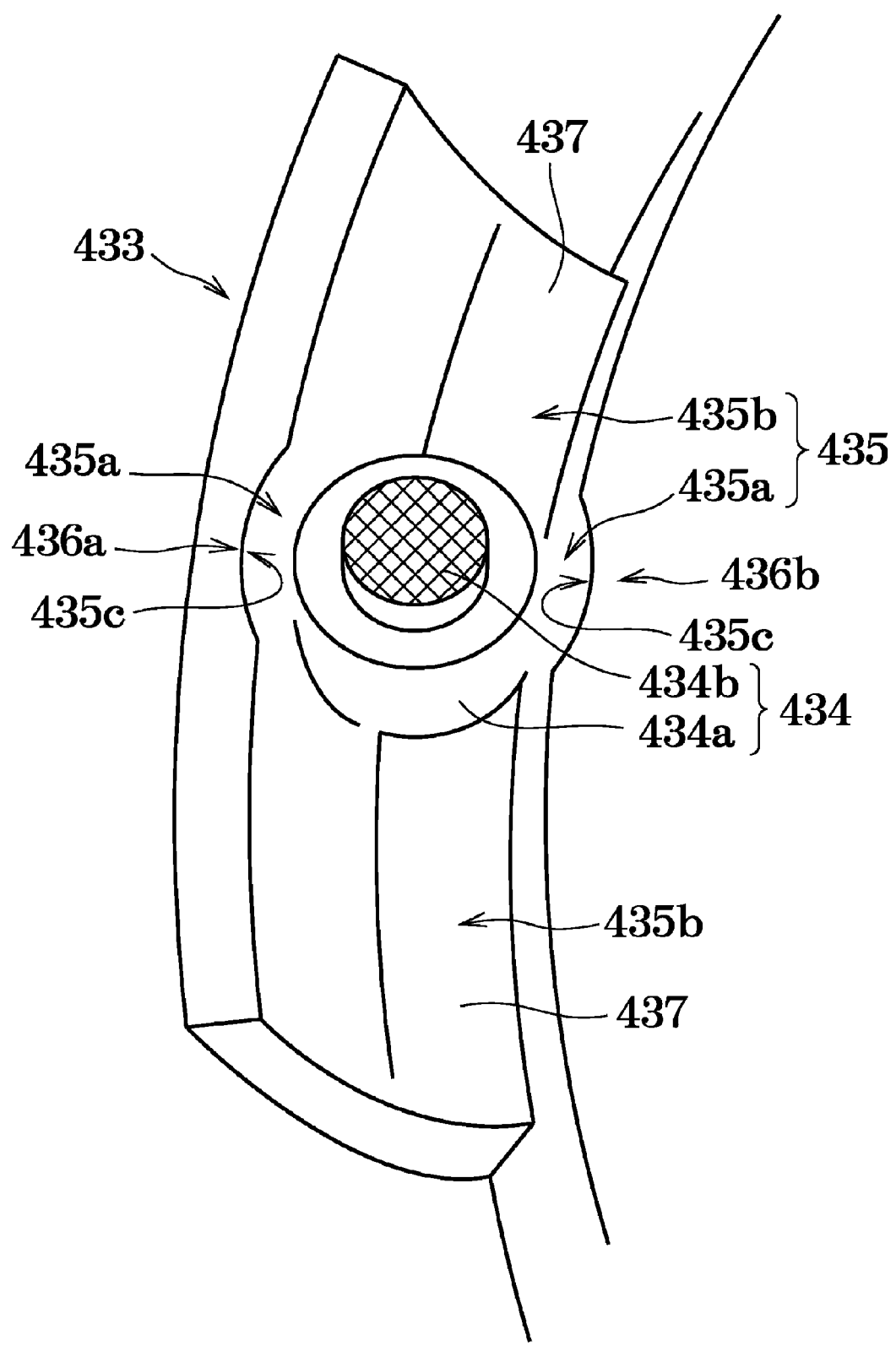
FIG. 9 is a perspective view of a rear side of a second guide portion.

FIG. 8 is an enlarged cross-sectional view of the gate cut portion 434 and its vicinity. FIG. 9 is a perspective view of the rear side of the second guide portion 433.

As illustrated in FIGS. 8 and 9, the gate cut portion 434 preferably includes a thick portion 434a and a rupture portion 434b. The thick portion 434a preferably includes a substantially cylindrical shape, and protrudes downward from the rear surface of the second guide portion 433. The rupture portion 434b preferably protrudes slightly further downward from a lower end face of the thick portion 434a. The rupture portion 434b is provided as a result of the rupture of the resin inside the gate 51a at the time of the injection molding. The rupture portion 434b preferably has a rupture surface with a greater surface roughness than that of the rear surface of the second guide portion 433.

The recessed portion 435 is also arranged on the rear surface of the second guide portion 433. The gate cut portion 434 is arranged inside the recessed portion 435. The depth of the recessed portion 435 and the axial dimension of the gate cut portion 434 are preferably set such that the lowermost end of the rupture portion 434b is positioned higher than the lower surface of the plate portion 431b. This prevents the rupture portion 434b from coming into contact with the upper surface of the flange portion 422 of the rotor holder 42.

The recessed portion 435 preferably includes first groove portions 435a, which are arranged radially outward and inward of the thick portion 434a, and second groove portions 435b, which are circumferentially adjacent to the thick portion 434a. Each first groove portion 435a preferably extends along a side of the thick portion 434a so as to assume the shape of a substantially circular arc, and has a smaller depth than the second groove portions 435b. Portions 436a and 436b which are arranged adjacent to and radially outward and radially inward of the first groove portions 435a preferably include a portion notched by the first groove portions 435a. In addition, the second guide portion 433 preferably includes thin portions 437. Each thin portion 437 is circumferentially adjacent to the thick portion 434a, and includes a smaller axial dimension than the thick portion 434a. An upper surface of the thin portion 437 preferably defines a bottom surface of the second groove portion 435b.

The formation of the first groove portions 435a and the second groove portions 435b contributes to reducing a difference in axial dimension between the first guide portion 432 and the second guide portion 433. The formation of the first groove portions 435a and the second groove portions 435b also contributes to preventing a depression (a so-called sink mark) from being formed on the surface of the cone 43 due to the difference in thickness between different portions of the cone 43 when the molten resin is hardened in the injection molding.

Sides 435c of the first groove portions 435a form tapered surfaces such that the inside diameter thereof progressively increases in a downward direction. This makes it easier to separate the cone 43 from the fixed mold 51 at the time of the injection molding.

A preferred material for the cone 43 is polycarbonate resin, but this is not essential to the present invention. Other exemplary materials usable for the cone 43 include: thermoplastic resins such as polyacetal, nylon, polyamide-imide (PAI), polyether ether ketone (PEEK), thermoplastic polyimide (TPI), polytetrafluoroethylene (PTFE), polyphenylene sulfide (PPS), polybutylene terephthalate (PBT), and polyetherimide (PEI); a mixture of two or more types of thermoplastic resins; thermosetting resins such as phenol resin; and a mixture of thermoplastic and thermosetting resins.

While a preferred embodiment of the present invention has been described above, it will be understood by those skilled in the art that the present invention is not limited to the above-described preferred embodiment.

In the above-described preferred embodiment, the cone 43 has five gate cut portions 434. In other embodiments of the present invention, however, the cone may have one to four or more than five gate cut portions.

In the above-described preferred embodiment, the first groove portions 435a are arranged both radially outward of and radially inward of the thick portion 434a. In other embodiments of the present invention, however, the first groove portion may be arranged only either radially outward of or radially inward of the thick portion.

In the above-described preferred embodiment, of the clamper 13 and the chucking device 4, the clamp magnet 44 is provided in the chucking device 4. In other embodiments of the present invention, however, the clamp magnet may be provided in the clamper.

In the above-described preferred embodiment, the clamp magnet 44 and the back yoke 45 are accommodated in the accommodating portion 431 of the cone 43. In other embodiments of the present invention, however, only one of the clamp magnet and the back yoke may be accommodated in the accommodating portion of the cone.

In the above-described preferred embodiment, the cone 43 is secured to the shaft 41 via the rotor holder 42. In other embodiments of the present invention, however, the cone may be secured directly to the shaft. Also, in other embodiments of the present invention, the cone may be slidable upward and downward along the shaft.

In the above-described preferred embodiment, the cone 43, the chucking device 4, the brushless motor 12, and the disc drive apparatus 1 designed for the optical disc 90 have been described. It will be understood, however, that the present invention is also applicable to various other data storage medium support members, chucking devices, brushless motors, and disc drive apparatuses designed for other types of discs such as magnetic discs or the like.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A data storage medium support member produced by a resin molding process, the support member comprising:
   an accommodating portion arranged to accommodate a retaining member about a central axis;
   a guide portion having a guide surface arranged to guide an inner edge of a disc, the guide portion being arranged radially outward of the accommodating portion relative to the central axis; and
   a gate cut portion arranged on a rear surface of the guide portion, the gate cut portion corresponding to a gate arranged to inject molten resin; wherein
   the accommodating portion includes a plate portion extending radially, outward with respect to the central axis, and the guide portion has a higher axial dimension than an axial dimension of the plate portion; and
   the guide portion has a recessed portion on the rear surface thereof, and the gate cut portion is arranged inside the recessed portion.

2. The data storage medium support member according to claim 1, wherein the guide portion has a recessed portion on the rear surface thereof, and the gate cut portion is arranged inside the recessed portion.

3. The data storage medium support member according to claim 1, wherein the gate cut portion includes:
   an increased thickness portion arranged to protrude in an axial direction; and
   a rupture portion arranged on an axial end of the increased thickness portion, the rupture portion being defined by ruptured resin material.

4. The data storage medium support member according to claim 3, wherein the guide portion includes a decreased thickness portion circumferentially adjacent to the increased thickness portion and smaller in axial dimension than the increased thickness portion.

5. The data storage medium support member according to claim 4, wherein the increased thickness portion has a substantially cylindrical shape, and the guide portion has on the rear surface thereof a first groove portion and a second groove portion, the first groove portion being arranged at least either of radially outward of or radially inward of the increased thickness portion and extending along a side of the increased thickness portion so as to assume the shape of a substantially circular arc, the second groove portion having a bottom surface defining an upper surface of the decreased thickness portion.

6. A data storage medium support member produced by a resin molding process, the support member comprising:
   an accommodating portion arranged to accommodate a retaining member about a central axis;
   a guide portion having a guide surface arranged to guide an inner edge of a disc, the guide portion being arranged radially outward of the accommodating portion relative to the central axis; and
   a gate cut portion arranged on a rear surface of the guide portion, the gate cut portion corresponding to a gate arranged to inject molten resin; wherein
   the gate cut portion includes:
      an increased thickness portion arranged to protrude in an axial direction; and
      a rupture portion arranged on an axial end of the increased thickness portion, the rupture portion being defined by ruptured resin material
   the guide portion includes a decreased thickness portion circumferentially adjacent to the increased thickness portion and smaller in axial dimension than the increased thickness portion
   the increased thickness portion has a substantially cylindrical shape, and the guide portion has on the rear surface thereof a first groove portion and a second groove portion, the first groove portion being arranged at least either of radially outward of or radially inward of the increased thickness portion and extending along a side of the increased thickness portion so as to assume the shape of a substantially circular arc, the second groove portion having a bottom surface defining an upper surface of the decreased thickness portion and
   the first groove portion has a depth smaller than that of the second groove portion.

7. The data storage medium support member according to claim 5, wherein the first groove portion has a tapered side surface with an inside diameter thereof increasing progressively in a direction of an open side.

8. The data storage medium support member according to claim 1, wherein the guide portion includes:
   a first guide portion arranged to make contact with the inner edge of the disc when the disc is in a supported condition; and
   a second guide portion which makes no contact with the inner edge of the disc when the disc is supported thereon; and
   the gate cut portion is arranged on a rear surface of the second guide portion.

9. The data storage medium support member according to claim 8, wherein the second guide portion is greater in a circumferential dimension than the first guide portion.

10. The data storage medium support member according to claim 1, wherein a plurality of gate cut portions each arranged at a substantially even intervals therebetween are provided about the central axis.

11. The data storage medium support member according to claim 1, wherein:
   the accommodating portion includes a cylindrical portion having a substantially cylindrical shape; and
   the plate portion is arranged to extend radially outward from a lower end portion of the cylindrical portion.

12. A chucking device comprising:
   a shaft arranged in an upward/downward direction along a central axis;
   a disc mount portion secured to the shaft and having a mount surface on which a disc is to be mounted; and
   the data storage medium support member of claim 1 arranged above the disc mount portion.

13. A brushless motor comprising:
   a stationary unit;
   a rotor unit rotatably supported about the central axis with respect to the stationary unit;
   a torque producing unit arranged to produce torque centered on the central axis between the stationary unit and the rotor unit; and
   the chucking device of claim 12 arranged to rotate together with the rotor unit.

14. A disc drive apparatus having a disc, the disc drive apparatus comprising:
   the brushless motor of claim 13;
   a retaining member arranged to retain the disc on the mount surface; and
   a recording/reproducing unit arranged to read information from and/or write information to the disc.

* * * * *